United States Patent
Fenkanyn et al.

(10) Patent No.: US 11,641,053 B2
(45) Date of Patent: May 2, 2023

(54) READER SYSTEM FOR TIRE WITH AN INTEGRATED RFID AND TPMS SENSOR

(71) Applicant: The Goodyear Tire & Rubber Company, Akron, OH (US)

(72) Inventors: John Michael Fenkanyn, Akron, OH (US); Mario Vincent Orosa, North Canton, OH (US); Shannon D Baker, Tallmadge, OH (US); Christopher Michael Knauf, Norton, OH (US); Andrew Howard Merrow, Cuyahoga Falls, OH (US); Anguel Milkov Tcholakov, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 72 days.

(21) Appl. No.: 16/929,304

(22) Filed: Jul. 15, 2020

(65) Prior Publication Data

US 2021/0021015 A1    Jan. 21, 2021

Related U.S. Application Data

(60) Provisional application No. 62/876,161, filed on Jul. 19, 2019.

(51) Int. Cl.
*H01Q 1/22*    (2006.01)
*B60C 23/04*    (2006.01)

(52) U.S. Cl.
CPC ....... *H01Q 1/2241* (2013.01); *B60C 23/0452* (2013.01)

(58) Field of Classification Search
CPC .............. H01Q 1/2241; B60C 23/0452; B60C 23/0444; B60C 23/0493
USPC .................................... 340/442–447
See application file for complete search history.

(56) References Cited

U.S. PATENT DOCUMENTS

| | | |
|---|---|---|
| 5,541,574 A | 7/1996 | Lowe et al. |
| 6,087,930 A | 7/2000 | Kulka et al. |
| 6,535,116 B1 * | 3/2003 | Zhou ................... B60C 23/0408 340/447 |

(Continued)

FOREIGN PATENT DOCUMENTS

| | | | |
|---|---|---|---|
| CN | 108734040 B * | 7/2021 | ......... G06K 7/10118 |
| WO | 2009143994 A1 | 12/2009 | |

(Continued)

*Primary Examiner* — Eric Blount
(74) *Attorney, Agent, or Firm* — Edward T. Kennedy

(57) ABSTRACT

A reader system for a tire with an integrated radio frequency identification (RFID) and tire pressure monitoring system (TPMS) sensor, in which the integrated RFID and TPMS sensor is mounted on the tire, is provided. The reader system includes at least one antenna that is external to the tire. The at least one antenna is mounted on a vehicle on which the tire is mounted in a location proximate the tire. The at least one antenna is in electronic communication with the integrated RFID and TPMS sensor. A reader is mounted on the vehicle and is also in electronic communication with the at least one antenna. The at least one antenna relays a signal from the integrated RFID and TPMS sensor to the reader. A display device is in electronic communication with the reader to receive and display data from the integrated RFID and TPMS sensor.

18 Claims, 6 Drawing Sheets

(56) References Cited

U.S. PATENT DOCUMENTS

| | | | |
|---|---|---|---|
| 6,581,449 B1* | 6/2003 | Brown | G01M 17/02 340/447 |
| 6,666,080 B2 | 12/2003 | Buist et al. | |
| 6,724,301 B2 | 4/2004 | Ginman et al. | |
| 6,879,252 B2* | 4/2005 | DeZorzi | B60C 23/0416 340/447 |
| 6,914,523 B2* | 7/2005 | Munch | B60C 23/042 73/146 |
| 7,104,438 B2 | 9/2006 | Benedict | |
| 7,378,951 B2* | 5/2008 | Hagi | B60C 23/0408 340/447 |
| 7,382,239 B2* | 6/2008 | Song | B60C 23/0444 340/447 |
| 7,518,512 B2* | 4/2009 | Ganz | G06K 19/0701 340/447 |
| 7,538,660 B2* | 5/2009 | Murakami | B60C 23/0408 73/146 |
| 7,541,916 B2 | 6/2009 | Choi et al. | |
| 7,730,772 B2 | 6/2010 | Cook et al. | |
| 7,948,364 B2* | 5/2011 | Lin | B60C 23/0416 340/447 |
| 7,983,293 B2 | 7/2011 | Kusunoki et al. | |
| 7,990,257 B2 | 8/2011 | Loehndorf et al. | |
| 8,106,758 B2 | 1/2012 | Loehndorf et al. | |
| 8,289,144 B2 | 10/2012 | Zhu et al. | |
| 8,330,594 B2* | 12/2012 | Suzuki | B60C 23/0413 73/146 |
| 9,108,473 B2 | 8/2015 | Haas et al. | |
| 9,248,709 B2 | 2/2016 | Darrer et al. | |
| 9,428,015 B2 | 8/2016 | Kitagawa et al. | |
| 9,475,348 B2 | 10/2016 | Hammer | |
| 9,505,502 B2 | 11/2016 | Miller | |
| 9,950,575 B2 | 4/2018 | Marques et al. | |
| 10,049,510 B2 | 8/2018 | Nyalamadugu et al. | |
| 10,105,997 B2 | 10/2018 | Fenkanyn et al. | |
| 10,220,660 B2* | 3/2019 | McIntyre | B60C 23/0471 |
| 10,682,892 B2 | 6/2020 | Bracq et al. | |
| 2003/0145650 A1* | 8/2003 | Juzswik | B60C 23/0416 73/146 |
| 2004/0027241 A1* | 2/2004 | Forster | B60C 23/0444 340/445 |
| 2005/0285727 A1* | 12/2005 | Watabe | B60C 23/0433 340/445 |
| 2006/0042734 A1 | 3/2006 | Turner et al. | |
| 2006/0055531 A1* | 3/2006 | Cook | B60C 23/0408 340/539.22 |
| 2006/0176163 A1* | 8/2006 | Choi | B60C 23/0408 340/693.1 |
| 2006/0250227 A1* | 11/2006 | Naito | B60C 23/0408 340/447 |
| 2007/0013502 A1* | 1/2007 | Park | B60C 23/0408 340/447 |
| 2007/0069877 A1 | 3/2007 | Fogelstrom | |
| 2008/0143507 A1* | 6/2008 | Cotton | B60C 23/0416 340/447 |
| 2008/0252435 A1 | 10/2008 | Chien et al. | |
| 2010/0212791 A1* | 8/2010 | Incavo | B60C 23/0493 235/487 |
| 2014/0002258 A1* | 1/2014 | Chen | B60C 23/0461 340/447 |
| 2019/0255893 A1* | 8/2019 | Van Wiemeersch | B60C 23/0479 |

FOREIGN PATENT DOCUMENTS

| | | |
|---|---|---|
| WO | 2015074845 A1 | 5/2015 |
| WO | 2016055418 A1 | 4/2016 |
| WO | 2020020743 A1 | 1/2020 |

* cited by examiner

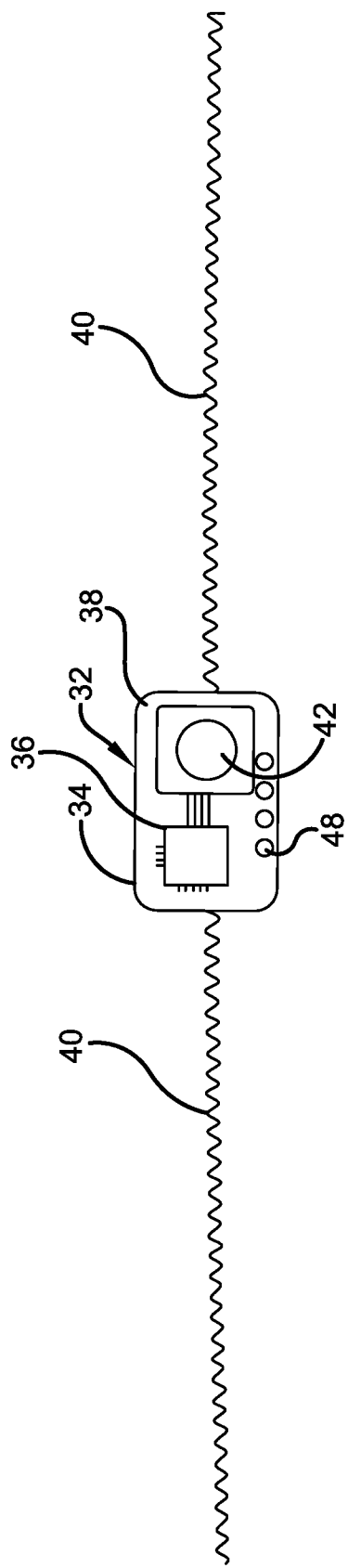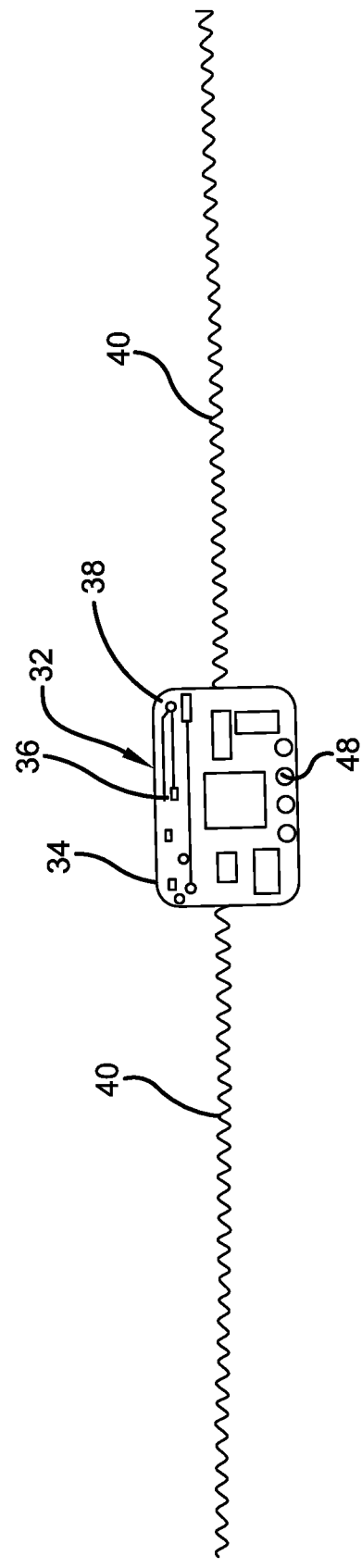

READER SYSTEM FOR TIRE WITH AN INTEGRATED RFID AND TPMS SENSOR

FIELD OF THE INVENTION

The invention relates to tires. More particularly, the invention relates to the monitoring of tire pressure and tire identification. Specifically, the invention is directed to a reader system for a tire that includes a sensor which transmits tire pressure data and tire identification information by radio frequency.

BACKGROUND OF THE INVENTION

Pneumatic tires have been widely employed. Such tires include a pair of beads that are mounted on a wheel or rim. Each one of pair of sidewalls extends from a respective bead to a ground-engaging tread. A carcass, which is made of one or more plies, toroidally extends between the beads to reinforce the sidewalls and the tread. An innerliner is formed on the inside surface of the carcass. The wheel cooperates with the innerliner to define an interior or tire cavity that is inflated with air.

It has been desirable to provide such pneumatic tires with an electronic device that enables information about the tire to be transmitted to an external device for tracking of certain parameters and identification of the tire during its lifetime. One such electronic device is a radio frequency identification (RFID) device, sometimes referred to as an RFID tag.

Most RFID tags include an integrated circuit for storing and processing information and an antenna for receiving and transmitting a signal to an external reader using a radio frequency. The antenna is electronically connected to the integrated circuit and typically is carried on a substrate with the integrated circuit, such as a circuit board.

In addition, it is desirable to monitor certain parameters, such as the pressure in the tire cavity, the temperature in the tire cavity and/or the temperature in the tread or another tire component, and to transmit data for those parameters to an external reader that can record and/or display the data. To this end, tire pressure monitoring systems (TPMS) have been developed. Due to power and communication requirements of TPMS sensors, TPMS units have been separate from RFID tags.

Accurate and consistent reading of data from RFID tags and TPMS sensors may be difficult, particularly in certain vehicle operating conditions. For example, high vehicle speeds, such as speeds up to 200 miles per hour (mph), result in high rotational speeds for the tire. Such high rotational speeds make it difficult for a reader to consistently and accurately receive data from an RFID tag and/or a TMPS sensor.

As a result, there is a need in the art for a reader system that accurately and consistently reads data from a tire with a sensor which transmits tire pressure data and tire identification information by radio frequency.

SUMMARY OF THE INVENTION

According to an aspect of an exemplary embodiment of the invention, a reader system for a tire with an integrated radio frequency identification (RFID) and tire pressure monitoring system (TPMS) sensor, in which the integrated RFID and TPMS sensor is mounted on the tire, includes at least one antenna that is external to the tire. The at least one antenna is mounted on a vehicle on which the tire is mounted and is in a location proximate the tire. The at least one antenna is in electronic communication with the integrated RFID and TPMS sensor. A reader is mounted on the vehicle and is also in electronic communication with the at least one antenna. The at least one antenna relays a signal from the integrated RFID and TPMS sensor to the reader. A display device is in electronic communication with the reader to receive and display data from the integrated RFID and TPMS sensor.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Circumferential" means lines or directions extending along the perimeter of the surface of the annular tread perpendicular to the axial direction.

"Inboard" refers to the axial inner surface of the tire as mounted on the vehicle.

"Innerliner" means the layer or layers of elastomer or other material that form the inside surface of a tubeless tire and that contain the inflating fluid within the tire.

"Outboard" refers to the axial outer surface of the tire as mounted on a vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"RFID" means radio frequency identification.

"TPMS" means a tire pressure monitoring system.

BRIEF DESCRIPTION OF THE DRAWINGS

The invention will be described by way of example and with reference to the accompanying drawings, in which:

FIG. 3 is a top view of an exemplary embodiment of an integrated RFID and TPMS sensor;

FIG. 4 is a bottom view of the sensor shown in FIG. 3;

Similar numerals refer to similar parts throughout the drawings.

DETAILED DESCRIPTION OF THE INVENTION

A first exemplary embodiment of a reader system for a tire with an integrated RFID and TPMS sensor is shown in FIGS. 1 through 7 and is indicated generally at 10. The reader system 10 is installed on a vehicle 8, and reads a signal from an integrated RFID and TMPS sensor 32 that is mounted on a pneumatic tire 12. The reader system 10 may be employed in conjunction with one tire 12 and its associated RFID and TPMS sensor 32, or with multiple tires and their respective RFID and TPMS sensors. Reference herein shall be made to the reader system 10 being employed in conjunction with one tire 12 and its associated RFID and TPMS sensor 32, with the understanding that the system may be employed with multiple tires and their respective RFID and TPMS sensors.

Figure 1:
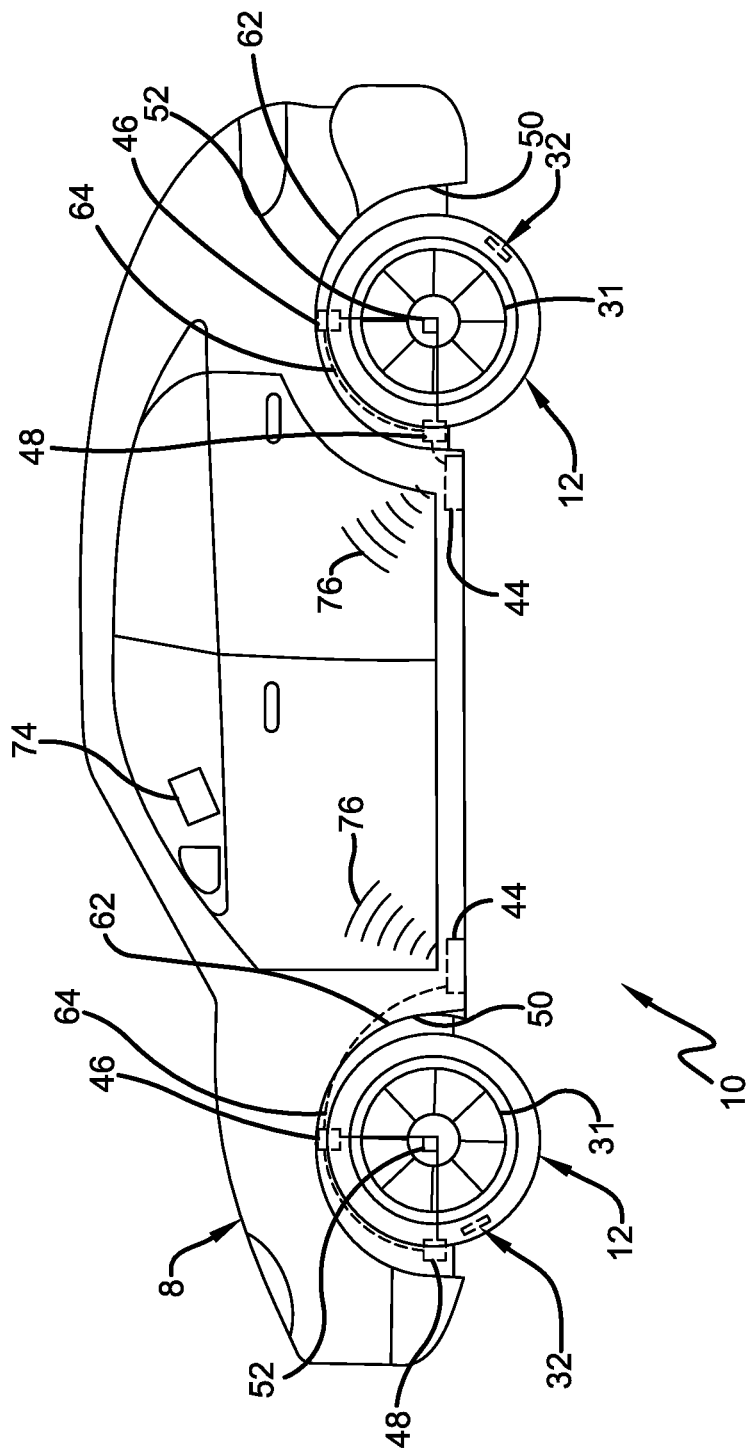
FIG. 1 is a side view of a vehicle including a first exemplary embodiment of a reader system for a tire with an integrated RFID and TPMS sensor.
Figure 2:
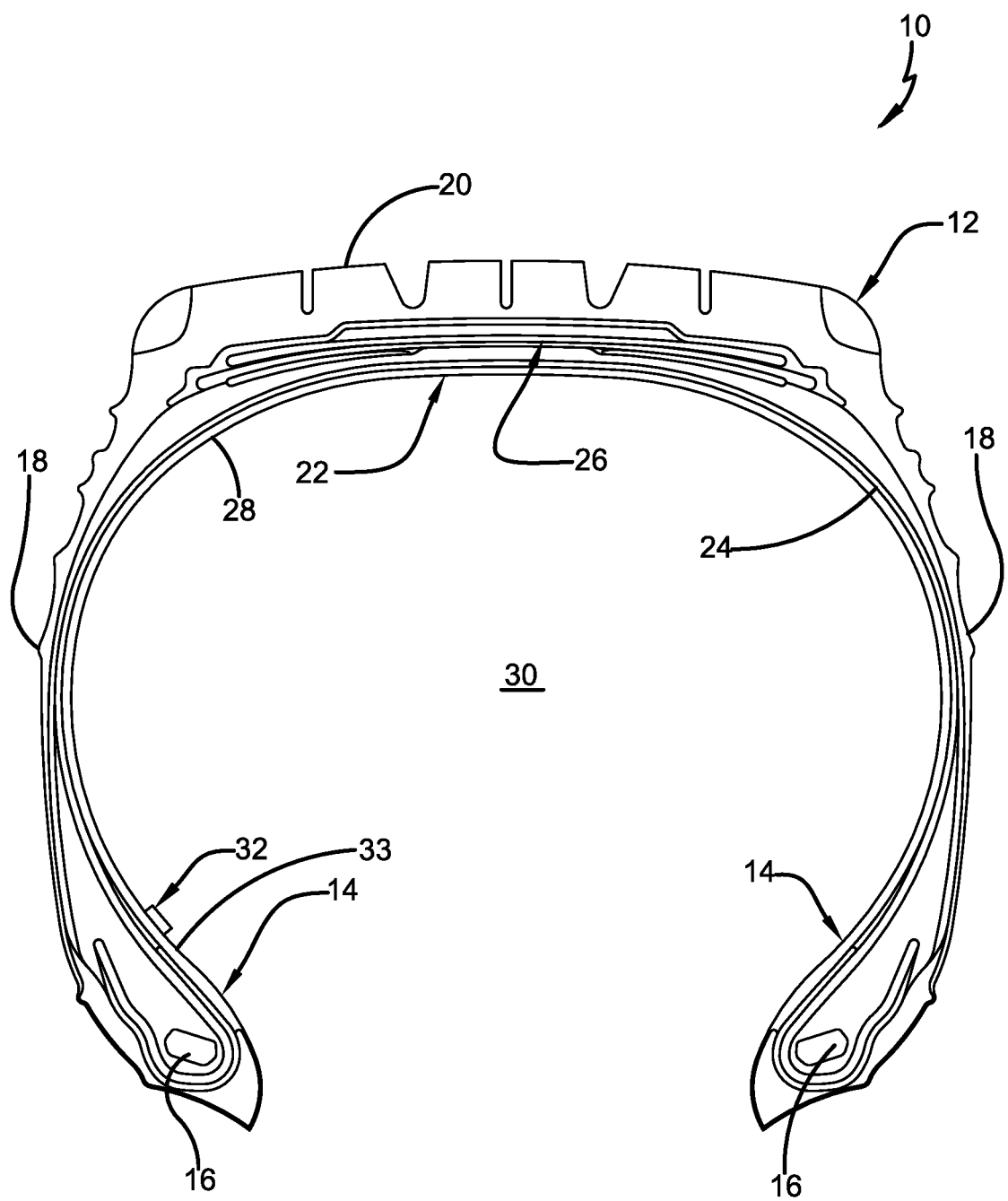
FIG. 2 is a cross-sectional view of a tire shown in FIG. 1.

With particular reference to FIG. 2, the tire 12 includes a pair of bead areas 14 and a respective bead core 16 embedded in each bead area. A respective sidewall 18 extends radially outward from each bead area 14 to a ground-contacting tread 20. The tire 12 is reinforced by a carcass 22 that toroidally extends from one of the bead areas 12 to the other one of the bead areas. The carcass 20 includes at least one ply 24 that preferably winds around each bead core 16. A belt reinforcement package 26 is disposed between the carcass 22 and the tread 20. An innerliner 28 is formed on the inside surface of the carcass 22. A tire cavity 30 is disposed inwardly of the innerliner 28. When the tire 12 is mounted on a wheel 31 (FIG. 1) of a vehicle, as known in the art, the innerliner 28 cooperates with the wheel to render the tire cavity 30 airtight. The integrated RFID and TPMS sensor 32 is mounted on the innerliner 28 in a lower sidewall area 33, just above the bead area 14. In this manner, the RFID and TPMS sensor 32 is disposed in the tire cavity 30.

The integrated RFID and TPMS sensor 32 and its attachment to the tire 12 is described in greater detail in an application being filed concurrently with the instant application, which is titled "Tire with an Integrated RFID and TPMS Sensor" and is owned by the same assignee as the current application, The Goodyear Tire & Rubber Company. That application is incorporated herewith in its entirety. For the purpose of convenience and an understanding of the device that the reader system 10 reads, a brief summary of the integrated RFID and TPMS sensor 32 follows.

Turning now to FIGS. 3 and 4, an exemplary embodiment of the RFID and TPMS sensor 32 includes an RFID tag 34, which in turn includes an integrated circuit 36. The integrated circuit 36 is carried on a printed circuit board 38 and processes and stores data for the tire 12. More particularly, the integrated circuit 36 includes electronic memory capacity for storing identification (ID) information for each tire 12, known as tire ID information. The integrated circuit 36 also modulates and demodulates a radio frequency signal for communication with an external reader 44 (FIG. 1) through an antenna 40. A TPMS sensor 42 is mounted on the RFID tag 34, and thus is in electronic communication with the integrated circuit 36 and the antenna 40. The TPMS sensor 42 includes a pressure sensor that measures the pressure in the tire cavity 30, and may also include one or more temperature sensors which measures the temperature within the tire cavity 30 and/or another component of the tire 12. Other sensors may also be mounted on the RFID tag 34, such as a stress sensor, a strain sensor, vibration sensor, accelerometer, and the like.

Returning to FIG. 1, the reader system 10 includes at least one antenna 46 that is in electronic communication with the integrated RFID and TPMS sensor 32 and is external to the tire 12. Preferably, only one antenna 46 is included in the reader system 10. Optionally, the reader system 10 may also include a second antenna 48 that is in electronic communication with the integrated RFID and TPMS sensor 32 and is external to the tire 12. Reference herein shall be made to two antennas 46 and 48 for the purpose of convenience, with the understanding that the reader system 10 may employ one antenna or more than two antennas. The external antennas 46 and 48 communicate with the RFID and TPMS sensor 32 and with the reader 44. In this manner, the external antennas 46 and 48 boost and relay the signal from the RFID and TPMS sensor 32 to the reader 44, and also relay a signal from the reader to the RFID and TPMS sensor.

The two antennas 46 and 48 are mounted on the vehicle 8 separate from the tire 12, while being in close proximity to the tire. Preferred mounting locations for the antennas 46 and 48 include a wheel well 50 of the vehicle 8 proximate the tire 12, or on the frame of the vehicle proximate the tire. Reference herein will be made to the antennas 46 and 48 being mounted on the frame of the vehicle 8 proximate the tire 12 for convenience. To provide clearance for other components of the vehicle 8 and/or the tire 12, each antenna 46 and 48 preferably includes a maximum thickness that is under about one-quarter (0.25) of an inch. For optimum reading of the signal from the RFID and TPMS sensor 32 at high vehicle speeds, when two antennas 46 and 48 are employed, they are spaced apart from one another at a predetermined angle, indicated at 52. The angle 52 preferably is between about sixty (60) and about one hundred and twenty (120) degrees, and more preferably is about ninety (90) degrees. The antennas 46 and 48 may read the RFID and TPMS sensor 32 through the tire sidewall 18 and/or the tread 20.

Figure 5:
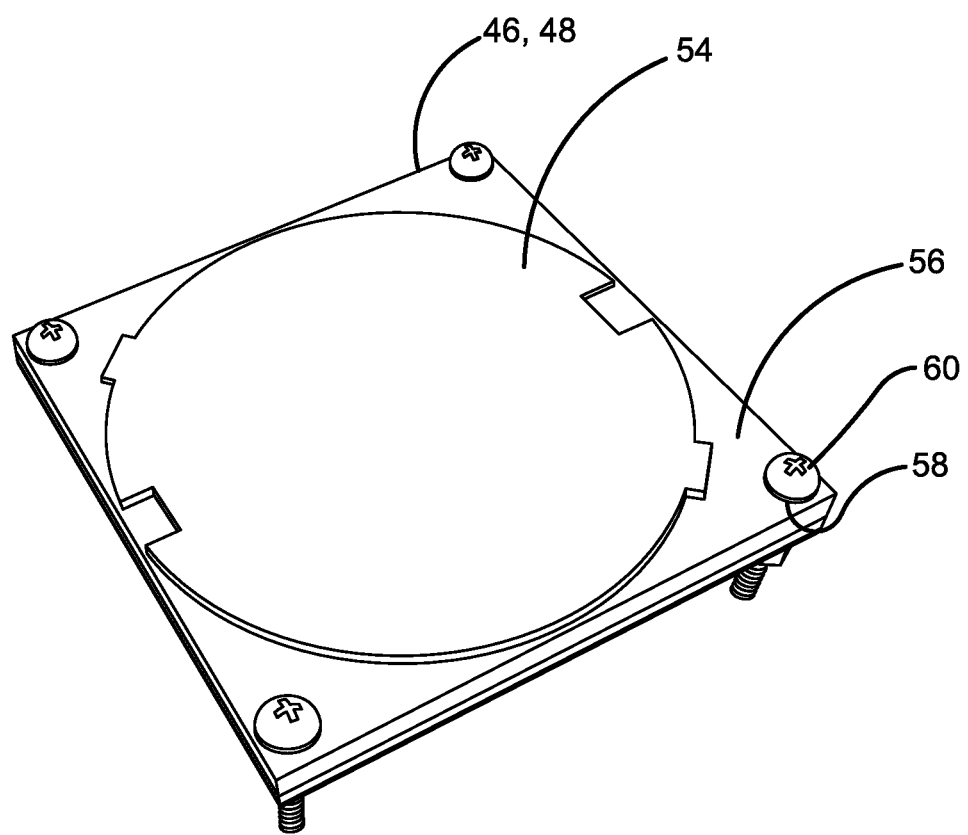
FIG. 5 is a perspective view of an exemplary antenna of the reader system shown in FIG. 1.

With additional reference to FIG. 5, each antenna 46 and 48 includes a conductor element 54, which relays signals from the RFID and TPMS sensor 32 to the reader 44, and from the reader to the RFID and TPMS sensor. Each antenna 46 and 48 also includes a base plate 56 that carries the conductor element 54 and enables the antenna to be mounted to the vehicle 8. For example, openings 58 may be formed in the base plate 56 to receive mechanical fasteners 60 that secure each antenna 46 and 48 to the frame of the vehicle 8 or to a wall 62 of the wheel well 50. Different structural configurations for each antenna 46 and 48 may be employed without affecting the overall concept or operation of the invention.

Optionally, the first antennal 46 may include a communication protocol or signal that is different from the communication protocol or signal of the second antenna 48. By employing different protocols or signals from each antenna 46 and 48, the data received from the antennas may be processed more efficiently and accurately, particularly at high vehicle speeds. Each antenna 46 and 48 may be independently powered, or may be powered by the reader 44, as will be described in detail below.

For communication with the RFID and TPMS sensor 32, the external antennas 46 and 48 each employ wireless communication. More particularly, the RFID and TPMS sensor 32 is a passive unit that sends and receives signals using a radio frequency, and preferably an ultra-high frequency (UHF) radio frequency. Thus, the electronic communication between each antenna 46 and 48 and the RFID and TPMS sensor 32 preferably is at a UFH radio frequency. In addition, the RFID and TPMS sensor 32 may include an energy harvester, which captures and thus harvests power from an electronic field of the UHF radio frequency transmitted by each antenna 46 and 48. Optionally, the RFID and TPMS sensor 32 may be pre-charged at a specific frequency using the antennas 46 and 48, which is turned off to enable the antennas to read the RFID and TPMS sensor. In addition, the energy harvester may alternatively capture and thus harvest optical energy, thermal energy and/or vibrational energy to power the RFID and TPMS sensor 32.

As described above, the antennas 46 and 48 relay the signal from the RFID and TPMS sensor 32 to the reader 44, and thus is in electronic communication with the reader. The connection between each antenna 46 and 48 to the reader 44 is through a connection means 64. The connection means 64 may be a wire or cable, thus providing a hard-wired connection, or a wireless connection using radio waves. Preferably, when each antenna 46 and 48 is powered by the reader 44, the connection means 64 includes a wire or cable to facilitate efficient power and signal transmission. The communication means 64 also relays signals from the reader to the antennas 46 and 48, for transmission from the reader to the RFID and TPMS sensor 32.

Figures 6, 7:
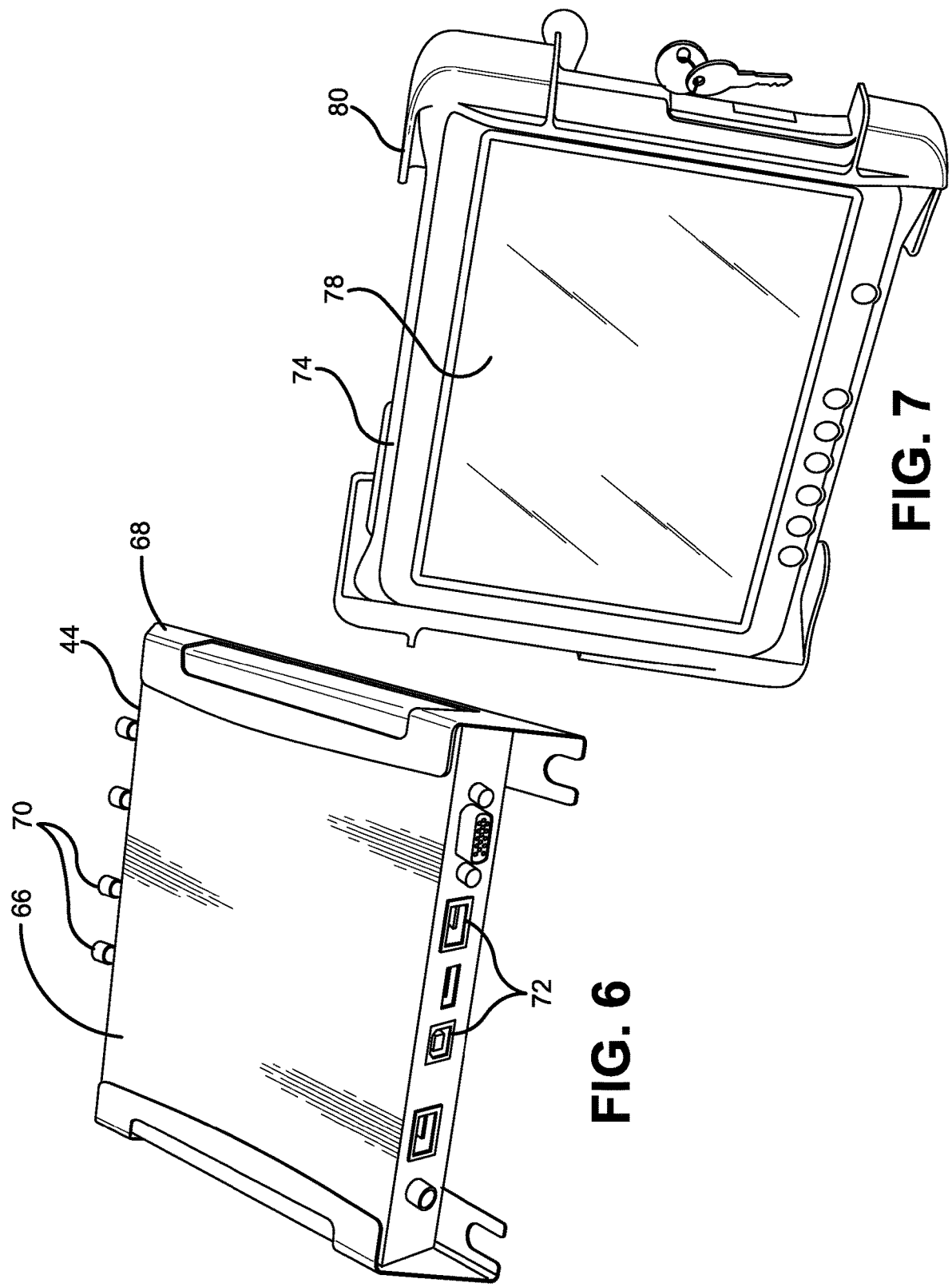
FIG. 6 is a perspective view of an exemplary reader of the reader system shown in FIG. 1.
FIG. 7 is a perspective view of an exemplary display device of the reader system shown in FIG. 1.

Referring to FIGS. 1 and 6, the reader 44 preferably includes a housing 66. Mounting means 68, such as brackets to engage or receive the housing to enable the reader to be secured to and mounted on the vehicle 8. Preferably, the reader 44 is disposed on the vehicle 8 in a protected location to preserve the integrity of the reader. The reader 44 may include multiple antenna connection ports 70 to receive the connection means 64, such as wires or cables, from each antenna 46 and 48. The reader 44 may also include device connection ports 72 to enable the reader to connect to an external programming device, such as a computer, as well as to a controlled area network (CAN bus) of the vehicle 8, and/or to a display device 74. Alternatively, the reader 44 may connect to each antenna 46 and 48, the external programming device, and/or the display device 74 using respective wireless connections. The reader 44 includes internal storage capability to receive and store data from the RFID and TPMS sensor 32 through each antenna 46 and 48. Such storage preferably is non-volatile, retaining data when there is no power to the reader 44. Using the device connection ports 72 or a wireless connection, the reader 44 may also send or transmit data from the RFID and TPMS sensor 32, received through each antenna 46 and 48, to a computer, the vehicle CAN bus and/or the display device 74.

With reference to FIGS. 1 and 7, the reader system 10 also preferably includes the display device 74. The display device 74 is in electronic communication with the reader 44, and may be directly or indirectly connected to the reader. A direct connection between the display device 74 and the reader 44 is through a connection means 76. The connection means 76 may be a wire or cable, thus providing a hard-wired connection, or a wireless connection using radio waves. An indirect connection between the display device 74 and the reader 44 includes electronically connecting the display device and the reader to the vehicle CAN bus, thereby providing communication between the display device and the reader through the CAN bus.

The connection and communication between the reader 44 and the display device 74 enables the display device to receive and display the data that is gathered by the RFID and TPMS sensor 32, and which is transmitted to the reader through each antenna 46 and 48. The display device 74 thus includes a display screen 78 to present the data from the RFID and TPMS sensor 32. The display screen 78 may be an interactive screen that enables a user to configure and/or scroll through data as desired. In addition, the display device 74 may include a processor to run computer application software to organize and store data from the RFID and TPMS sensor 32.

The connection means 76 also enable communication from the display device 74 to the reader 44, so that a user may actuate and/or control the RFID and TPMS sensor 32 using the display device. For such actuation, the display device 74 transmits or sends a control signal to the reader 44, which communicates the control signal to the RFID and TPMS sensor 32 through each antenna 46 and 48. The display device 74 may be disposed within the vehicle 8, or may be remote from the vehicle. To enable the display device 74 to be disposed within the vehicle 8, the display device may include mounting means 80, such as a bracket, to engage or receive the display device and secure it to a structure of the vehicle.

The reader 44 and/or the display device 74 may also be equipped with an antenna to wirelessly transmit selected data from the integrated RFID and TPMS sensor 32 to a remote processor, such as a processor in a cloud-based server. The data from the integrated RFID and TPMS sensor 32 may thus be stored and analyzed remotely, and/or displayed on remote devices, such as televisions and/or mobile phones.

Figure 8:
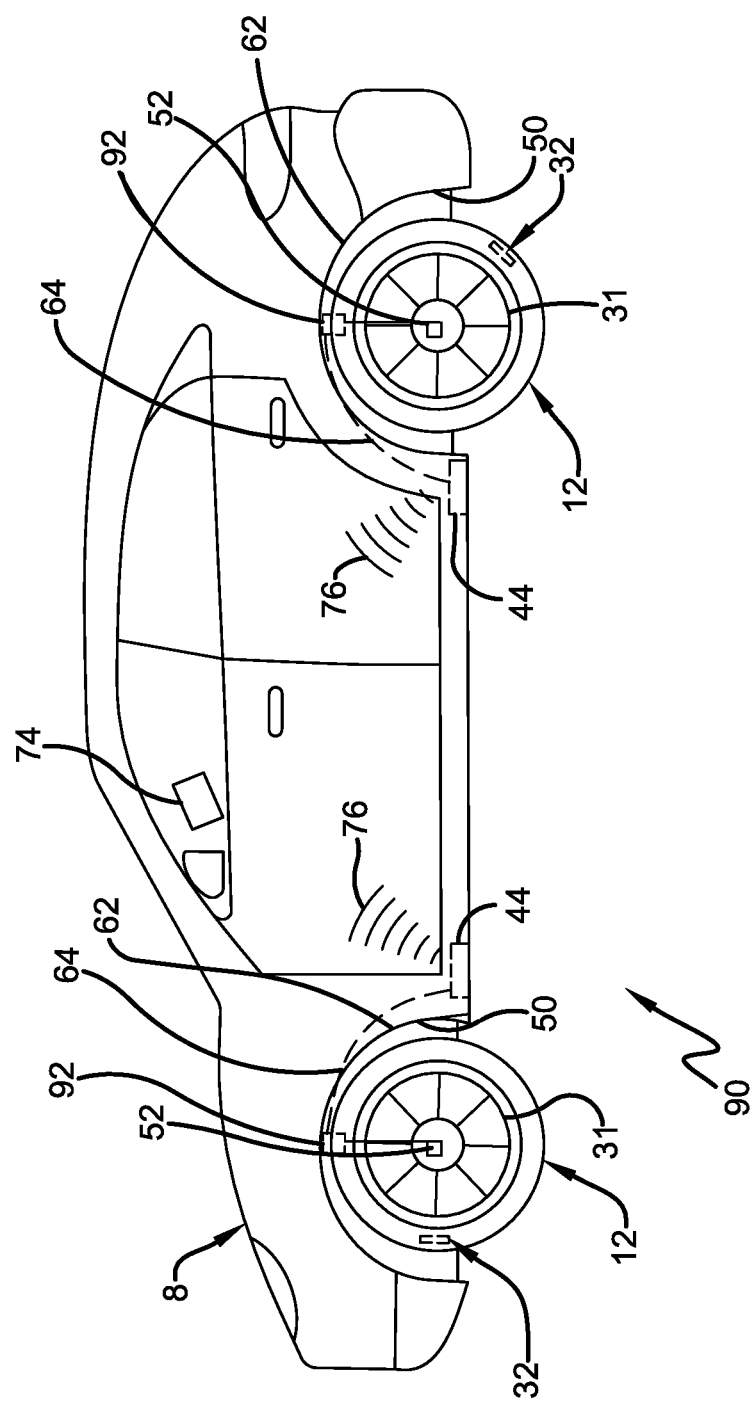
FIG. 8 is a side view of a vehicle including a second exemplary embodiment of a reader system for a tire with an integrated RFID and TPMS sensor.

Turning to FIG. 8, a second exemplary embodiment of a reader system for a tire with an integrated RFID and TPMS sensor is indicated generally at 90. The second embodiment reader system 90 is similar in structure and function to the first embodiment reader system 10, with the primary exception being that the second embodiment reader system includes one antenna 92 that is in electronic communication with the integrated RFID and TPMS sensor 32. The antenna 92 is external to the tire 12 and communicates with the RFID and TPMS sensor 32 and with the reader 44. In this manner, the external antenna 92 boosts and relays the signal from the RFID and TPMS sensor 32 to the reader 44, and also relays a signal from the reader to the RFID and TPMS sensor. The antenna 92 is mounted on the vehicle 8 separate from the tire 12, while being in close proximity to the tire. Preferred mounting locations for the antenna 92 include a wheel well 50 of the vehicle 8 proximate the tire 12, or on the frame of the vehicle proximate the tire. To provide clearance for other components of the vehicle 8 and/or the tire 12, the antenna 92 preferably includes a maximum thickness that is under about one-quarter (0.25) of an inch. The antenna 92 may read the RFID and TPMS sensor 32 through the tire sidewall 18 and/or the tread 20.

In this manner, the reader system for a tire with an integrated RFID and TPMS sensor of the present invention 10, 90 includes at least one antenna 46, 48 and 92 disposed externally to the tire 12 to send and receive signals from the tire-mounted RFID and TPMS sensor 32. The antennas 46, 48 and 92 are in close proximity to the tire 12 and provide communication between the RFID and TPMS sensor 32 and the vehicle-mounted reader 44. The reader 44 communicates with a display device 74 to display data from the RFID and TPMS sensor 32 and enable actuation of the RFID and TPMS sensor. This structure enables the reader system 10, 90 to accurately and consistently read data from the RFID and TPMS sensor 32, particularly when the vehicle 8 operates at high speeds, such as up to about 200 mph. Of course, the reader system 10, 90 may be employed on vehicles 8 operating at any speed.

The present invention also includes a method of using a reader system for a tire with an integrated RFID and TPMS sensor 10, 90. The method includes steps in accordance with the description that is presented above and shown in FIGS. 1 through 8.

It is to be understood that the structure of the above-described reader system for a tire with an integrated RFID and TPMS sensor 10, 90 may be altered or rearranged, or components known to those skilled in the art omitted or added, without affecting the overall concept or operation of the invention. For example, any number of antennas 46, 48 and 92 may be employed for each reader system 10, 90, and any of the described alternatives or options may be used or not used, without affecting the overall concept or operation of the invention.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A reader system for a tire with an integrated radio frequency identification (RFID) and tire pressure monitoring system (TPMS) sensor, the integrated RFID and TPMS sensor being mounted on the tire, the reader system comprising:
   at least one antenna external to the tire, the at least one antenna being mounted on a vehicle on which the tire is mounted in a location proximate the tire, and being in electronic communication with the integrated RFID and TPMS sensor;
   a reader being mounted on the vehicle and being in electronic communication with the at least one antenna, wherein the at least one antenna relays a signal from the integrated RFID and TPMS sensor to the reader; and
   a display device in electronic communication with the reader to receive and display data from the integrated RFID and TPMS sensor, wherein the display device transmits an actuation signal to the reader mounted on the vehicle to actuate the integrated RFID and TPMS sensor mounted on the tire, and the at least one antenna that is external to the tire relays the actuation signal from the reader to the integrated RFID and TPMS sensor.

2. The reader system for a tire with an integrated radio frequency identification (RFID) and tire pressure monitoring system (TPMS) sensor of claim 1, wherein the at least one antenna includes two antennas.

3. The reader system for a tire with an integrated radio frequency identification (RFID) and tire pressure monitoring system (TPMS) sensor of claim 2, wherein the antennas are spaced apart from one another at an angle between about sixty (60) and about one hundred and twenty (120) degrees.

4. The reader system for a tire with an integrated radio frequency identification (RFID) and tire pressure monitoring system (TPMS) sensor of claim 2, wherein the two antennas include a first antennal and a second antenna, the first antenna including at least one of a communication protocol and a signal which is different from at least one of a communication protocol and a signal of the second antenna.

5. The reader system for a tire with an integrated radio frequency identification (RFID) and tire pressure monitoring system (TPMS) sensor of claim 3, wherein the antennas are spaced apart from one another at an angle of about ninety (90) degrees.

6. The reader system for a tire with an integrated radio frequency identification (RFID) and tire pressure monitoring system (TPMS) sensor of claim 1, wherein the RFID and TPMS sensor is pre-charged at a specific frequency with the at least one antenna, and the frequency is turned off to enable the at least one antenna to read the RFID and TPMS sensor.

7. The reader system for a tire with an integrated radio frequency identification (RFID) and tire pressure monitoring system (TPMS) sensor of claim 1, wherein the at least one antenna is mounted in a wheel well of the vehicle proximate the tire.

8. The reader system for a tire with an integrated radio frequency identification (RFID) and tire pressure monitoring system (TPMS) sensor of claim 1, wherein the at least one antenna is mounted on the frame of the vehicle proximate the tire.

9. The reader system for a tire with an integrated radio frequency identification (RFID) and tire pressure monitoring system (TPMS) sensor of claim 1, wherein the electronic communication between the at least one antenna and the integrated RFID and TPMS sensor is by ultra-high frequency radio frequency.

10. The reader system for a tire with an integrated radio frequency identification (RFID) and tire pressure monitoring system (TPMS) sensor of claim 1, wherein the electronic communication between the at least one antenna and the reader is by at least one of a wire and a cable.

11. The reader system for a tire with an integrated radio frequency identification (RFID) and tire pressure monitoring system (TPMS) sensor of claim 10, wherein the reader powers the at least one antenna through the at least one of a wire and a cable.

12. The reader system for a tire with an integrated radio frequency identification (RFID) and tire pressure monitoring system (TPMS) sensor of claim 1, wherein the electronic communication between the at least one antenna and the reader is by a wireless connection.

13. The reader system for a tire with an integrated radio frequency identification (RFID) and tire pressure monitoring system (TPMS) sensor of claim 1, wherein the electronic communication between the reader and the display device reader is by at least one of a wire and a cable.

14. The reader system for a tire with an integrated radio frequency identification (RFID) and tire pressure monitoring system (TPMS) sensor of claim 1, wherein the electronic communication between the reader and the display device reader is by a wireless connection.

15. The reader system for a tire with an integrated radio frequency identification (RFID) and tire pressure monitoring system (TPMS) sensor of claim 1, wherein the electronic communication between the reader and the display device reader is through a vehicle controlled area network bus.

16. The reader system for a tire with an integrated radio frequency identification (RFID) and tire pressure monitoring system (TPMS) sensor of claim 1, wherein the display device is disposed within the vehicle.

17. The reader system for a tire with an integrated radio frequency identification (RFID) and tire pressure monitoring system (TPMS) sensor of claim 1, wherein the display device is remote from the vehicle.

18. The reader system for a tire with an integrated radio frequency identification (RFID) and tire pressure monitoring system (TPMS) sensor of claim 1, wherein at least one of the reader and the display device includes an antenna to wirelessly transmit selected data from the integrated RFID and TPMS sensor to a remote processor.

* * * * *